United States Patent
Jin et al.

(10) Patent No.: US 8,484,581 B2
(45) Date of Patent: Jul. 9, 2013

(54) APPARATUS AND METHOD FOR DISPLAYING USER INTERFACE FOR TELECOMMUNICATION TERMINAL

(75) Inventors: Jeong-Gyu Jin, Suwon-si (KR); Yong-Kook Park, Seongnam-si (KR); Lee-Seok Yoon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 2055 days.

(21) Appl. No.: 11/132,968

(22) Filed: May 19, 2005

(65) Prior Publication Data

US 2006/0238496 A1    Oct. 26, 2006

(30) Foreign Application Priority Data

Apr. 22, 2005 (KR) .................. 10-2005-0033782

(51) Int. Cl.
    *G09G 5/14* (2006.01)
(52) U.S. Cl.
    USPC .................................... 715/864; 715/798
(58) Field of Classification Search
    USPC .................. 715/864, 798; 382/296; 455/566, 455/575.1, 575.4
    See application file for complete search history.

(56) References Cited

U.S. PATENT DOCUMENTS

| | | | |
|---|---|---|---|
| 2004/0157647 A1* | 8/2004 | Takahashi | 455/566 |
| 2005/0020325 A1* | 1/2005 | Enger et al. | 455/575.3 |
| 2006/0202951 A1* | 9/2006 | Duarte et al. | 345/156 |

* cited by examiner

*Primary Examiner* — Namitha Pillai
(74) *Attorney, Agent, or Firm* — The Farrell Law Firm, P.C.

(57) ABSTRACT

Disclosed is a system for displaying a user interface for a telecommunication terminal. A control unit determines the current rotation state of a display unit through a rotation sensing unit. When the rotation state of the display unit varies, UI information is loaded according to the currently-determined rotation state of the display unit. The UI screen is reconstructed according to the loaded UI information and is then rotated according to the rotation state of the display unit and displayed on the display unit. If information on a dedicated UI screen which has been preset according to a currently-running application is found during the step of loading the UI information, then the information on the dedicated UI screen is loaded. The UI screen is reconstructed according to the loaded information on the dedicated UI screen and is displayed.

7 Claims, 11 Drawing Sheets

APPARATUS AND METHOD FOR DISPLAYING USER INTERFACE FOR TELECOMMUNICATION TERMINAL

PRIORITY

This application claims priority to an application entitled "Apparatus and Method for Displaying User Interface for Telecommunication Terminal" filed with the Korean Intellectual Property Office on Apr. 22, 2005 and assigned Serial No. 2005-33782, the contents of which are incorporated herein by reference.

BACKGROUND OF THE INVENTION

1. Field of the Invention

The present invention relates to a telecommunication terminal, and more particularly to a telecommunication terminal having a rotatable display unit.

2. Description of the Related Art

As technologies related to telecommunication terminals develop, current telecommunication terminals can not only provide stationary images, but also a video service such as a VOD (video on-demand). The display unit of conventional telecommunication terminals, however, has a vertical size larger than the horizontal size and, when supplied with a video service having a ratio of 16:9, the screen is generally reduced. Therefore, a telecommunication terminal having a rotatable display unit capable of displaying video information while being rotated in the horizontal direction is desired. This type of telecommunication terminal will hereinafter be referred to as a "horizontally-viewable telecommunication terminal."

FIGS. 1A to 1D show examples of conventional horizontally-viewable telecommunication terminals. FIG. 1A shows the display unit not rotated in the horizontal direction; FIG. 1B shows the display unit rotated in the horizontal direction; FIG. 1C shows the display unit rotated in the horizontal direction; and FIG. 1D shows the display unit is rotated in the horizontal direction. The horizontally-viewable telecommunication terminal can display video information in the horizontal direction, when providing a user with a video service such as a VOD, for a wider video screen. Using the horizontally-viewable telecommunication terminal, therefore, the user can be provided with a video service through a wider screen by rotating the display unit in the horizontal direction.

Conventional horizontally-viewable telecommunication terminals, however, have a problem in that the direction in which the UI (user interface) screen is displayed is fixed. More specifically, the UI screen is displayed from top to bottom in a conventional horizontally-viewable telecommunication terminal, as shown in FIG. 1A. The display direction of the UI screen remains the same, however, even after the display unit is rotated in the horizontal direction, and the UI screen is provided while lying in the horizontal direction as shown in FIG. 1B. When using a service such as a VOD, therefore, the user must select a desired video service while the display unit is not rotated as shown in FIG. 1A, due to the fixed display direction of the UI screen, and then rotate the display unit as shown in FIG. 1B after the video service begins to be provided. As such, the display unit must be unnecessarily rotated a number of times in the conventional horizontally-viewable telecommunication terminals.

Of course, the display direction of the UI screen may be rotated according to the rotation of the display unit, even in conventional horizontally-viewable telecommunication terminals. FIGS. 1C and 1D show examples of the UI screen displayed while being rotated. Although the UI screen is rotated as the display unit is rotated, referring to FIG. 1C, black regions appear on both sides of the modified screen and some regions are not visible due to mismatch of horizontal vs. vertical ratio. This is because only a single UI screen is used, the lengths of the horizontal and vertical display regions of which are predetermined. Although FIG. 1D also shows the UI screen displayed while being rotated, the UI screen is distorted because the horizontal vs. vertical ratio is inadvertently modified without considering the difference in length of the horizontal and vertical display regions.

SUMMARY OF THE INVENTION

Accordingly, the present invention has been made to solve the above-mentioned problems occurring in the prior art, and an object of the present invention is to provide an apparatus and a method for providing a suitable UI screen according to the state of the display region of a display unit in a horizontally-viewable telecommunication terminal for user convenience.

In order to accomplish this object, there is provided an apparatus for displaying a user interface for a telecommunication terminal having a rotatable display unit, the apparatus including a rotation sensing unit for sensing the rotation of the display unit; a memory unit for storing each UI information on at least one UI screen according to each rotation state of the display unit; and a control unit for choosing the UI information according to at least one of the rotation state of the display unit and an application currently run in the telecommunication terminal, constructing a UI screen according to the chosen UI information, rotating the constructed UI screen in a direction according to the rotation state of the display unit, and displaying the UI screen.

In accordance with another aspect of the present invention, there is provided a method for displaying a user interface for a telecommunication terminal having a rotatable display unit, a rotation sensing unit for sensing the rotation of the display unit, and a memory unit having at least one piece of UI information stored to construct a UI, the method including the steps of: sensing the current rotation state of the display unit when the rotation of the display unit is sensed; analyzing an application currently running in the telecommunication terminal; choosing UI information according to at least one of the rotation state of the display unit and the currently-running application; constructing the UI according to the chosen UI information; and displaying the constructed UI after rotating it in a direction according to the rotation state of the display unit.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted to avoid making the subject matter of the present invention unclear.

The basic principle of the present invention will now be described to aid the full understanding of the present invention. In a horizontally-viewable telecommunication terminal according to the present invention, a control unit checks the current rotation state of a display unit through a rotation sensing unit. When the rotation state of the display unit varies, UI information is loaded according to the currently-checked rotation state of the display unit. The UI screen is reconstructed according to the loaded UI information and is then rotated according to the rotation state of the display unit and displayed on the display unit. If information on a dedicated UI screen which has been preset according to a currently-run application is found during the step of loading the UI information, then the information on the dedicated UI screen is loaded. The UI screen is reconstructed according to the loaded information on the dedicated UI screen and is displayed. Even when the display unit is rotated, the user can be provided with a UI screen which is displayed after being suitably reconstructed and rotated according to the rotation state of the display unit.

Figure 2:
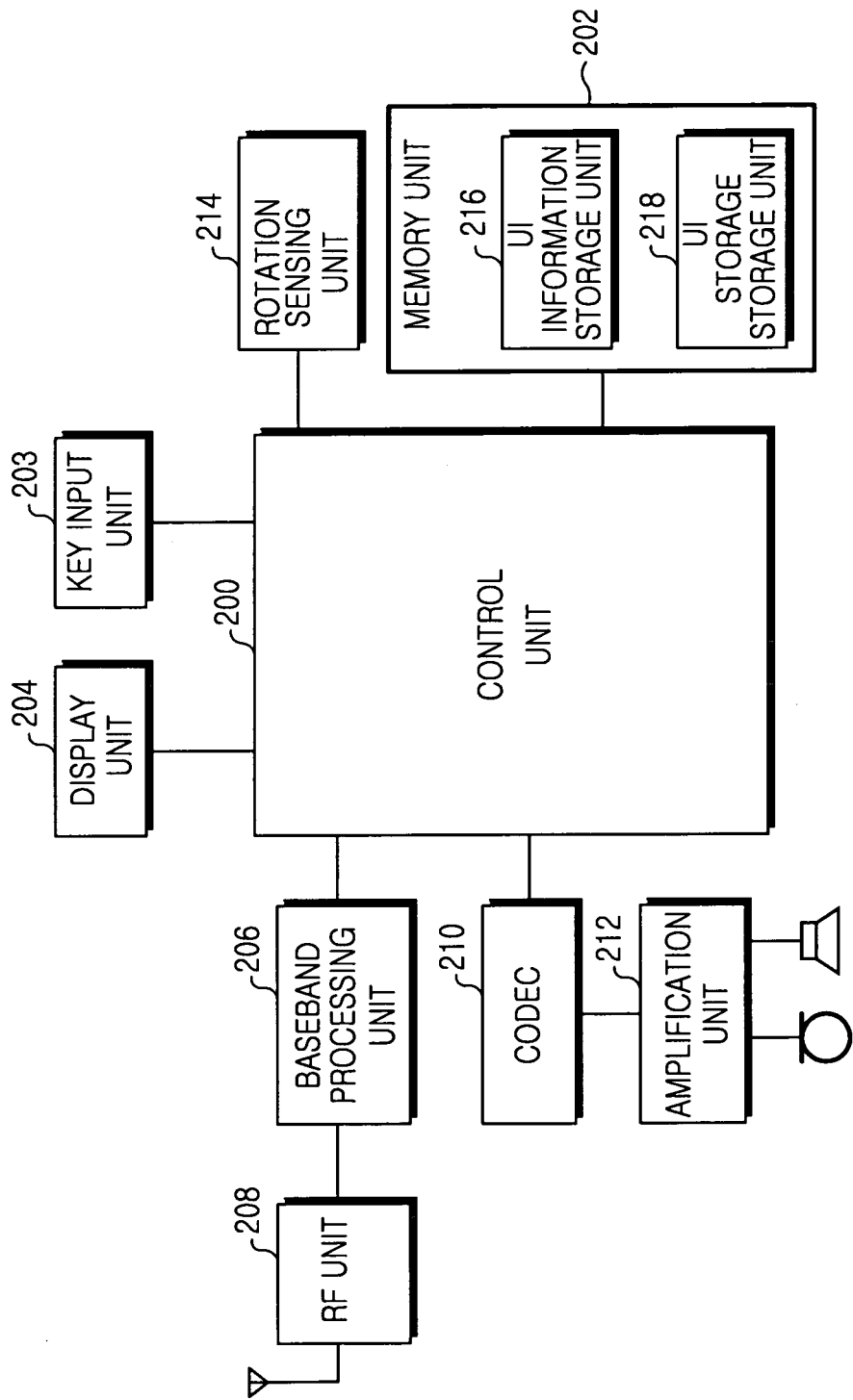
FIG. 2 is a block diagram showing the construction of a horizontally-viewable telecommunication terminal according to an embodiment of the present invention.

FIG. 2 is a block diagram showing the construction of a horizontally-viewable telecommunication terminal according to an embodiment of the present invention. Referring to FIG. 2, a horizontally-viewable telecommunication terminal according to an embodiment of the present invention has a memory unit 202, a key input unit 203, a display unit 204, a baseband processing unit 206, a codec 210, and a rotation sensing unit 214, all of which are connected to a control unit 200. The control unit 200 processes voice signals and data according to a protocol for telephone communication, data communication, or wireless Internet access and controls each part of the telecommunication terminal. The control unit 200 receives user key input from the key input unit 203 and controls the display unit 204 to create and provide video information according to the key input from the user.

The control unit 200 senses the rotation state of the display unit 204 through the rotation sensing unit 214 and determines if the display unit 204 is rotated in the horizontal direction. If rotation of the display unit 204 is sensed by the rotation sensing unit 214, the control unit 200 determines the current rotation state of the display unit 204. As used herein, the "rotation" refers to a case wherein the display unit 204 is rotated from a vertical direction as shown in FIG. 1A to a horizontal direction as shown in FIG. 1B or vice versa.

The control unit 200 chooses a UI from the UI setup information according to the determined rotation state of the display unit 204. The UI setup information includes information on UIs which have been preset according to the rotation state of the display unit 204 and a currently-run application. Once the UI is decided from the UI setup information according to the rotation state of the display unit 204 and the currently-run application, UI information is loaded from the memory unit 202 according to the decided UI, and the UI screen is reconstructed according to the loaded UI. The reconstructed UI screen is displayed according to the rotation state of the display unit 204. For example, when the display unit 204 is rotated from the vertical direction to the horizontal direction, the control unit 200 rotates the reconstructed UI screen according to the rotation state of the display unit 204 and displays it. If the display unit 204 is rotated +90°, the control unit 200 rotates the reconstructed UI screen in the opposite direction, i.e. −90°, so that the UI screen is always displayed to the user from top to bottom.

The memory unit 202 connected to the control unit 200 includes a ROM, a flash memory, and a RAM. The ROM stores programs and various reference data for processing and controlling the control unit 200. The RAM provides the control unit 200 with a working memory. The flash memory provides a region for storing various storage data which can be updated. The memory unit 202 has a region for storing setup information on U's which have been preset according to the rotation state of the display unit 204 and the currently-run application. This region is shown as the UI setup information storage unit 218. The memory unit 202 has a region for storing information on the UI screen to be displayed on the display unit 204 according to each UI, including the horizontal and vertical sizes of the screen, the display position of icons and picture data, the type of cursors and items, and the size and type of fonts. This region is shown as the UI information storage unit 216.

Figure 1A:
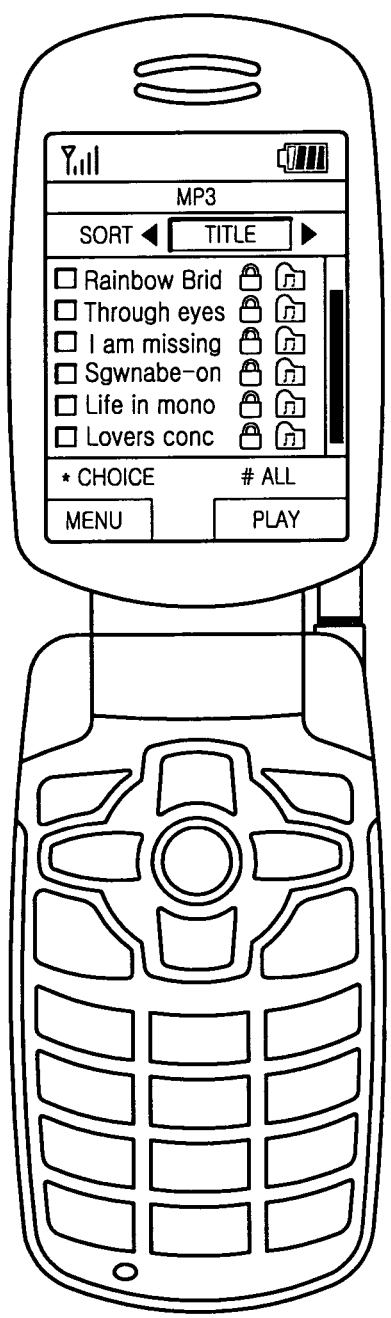
FIG. 1A is an illustrative view showing a conventional horizontally-viewable telecommunication terminal wherein the display unit is not rotated.
Figure 1B:
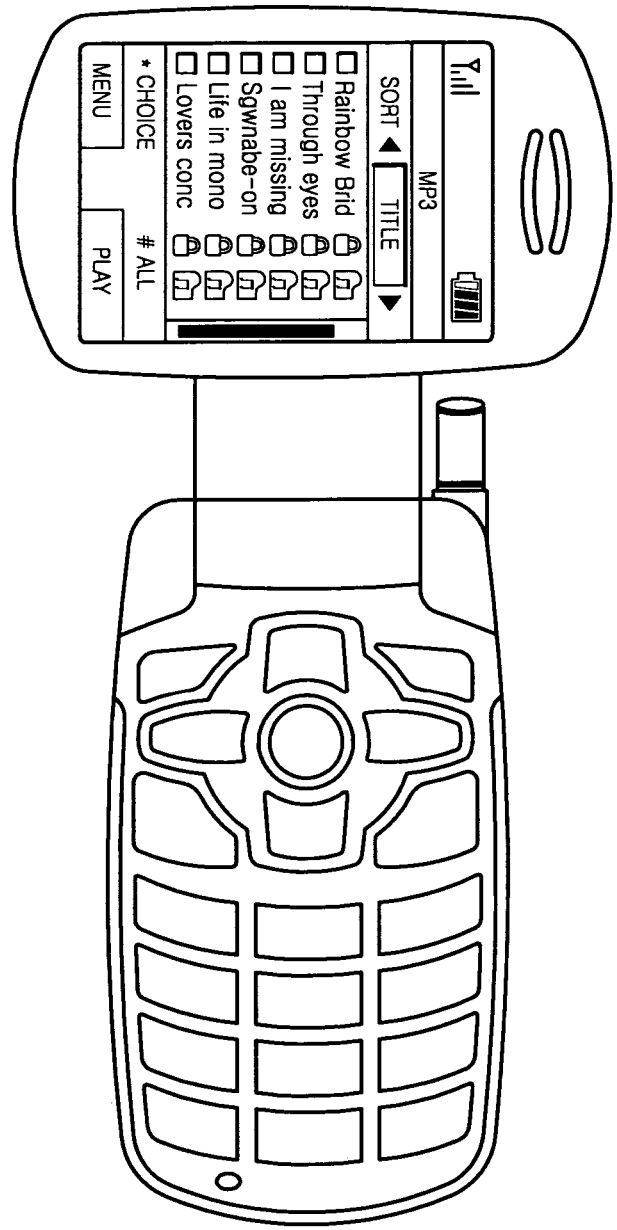
FIG. 1B is an illustrative view showing a conventional horizontally-viewable telecommunication terminal wherein the display unit is rotated.
Figure 1C:
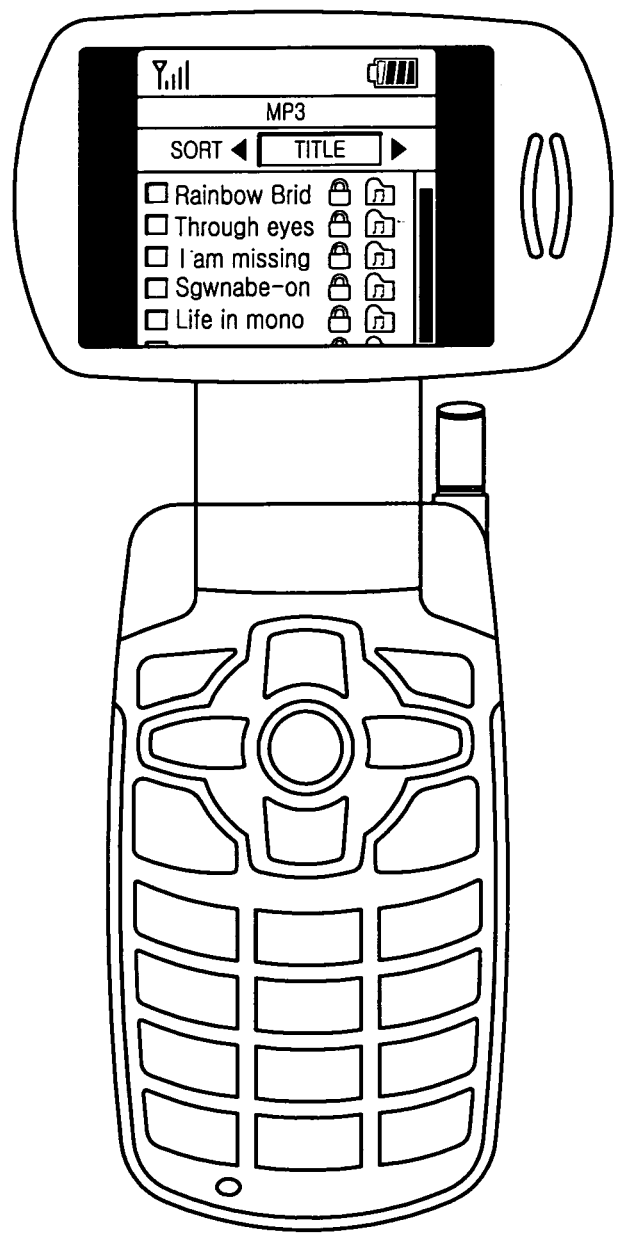
FIG. 1C is another illustrative view showing a conventional horizontally-viewable telecommunication terminal wherein the display unit is rotated.
Figure 1D:
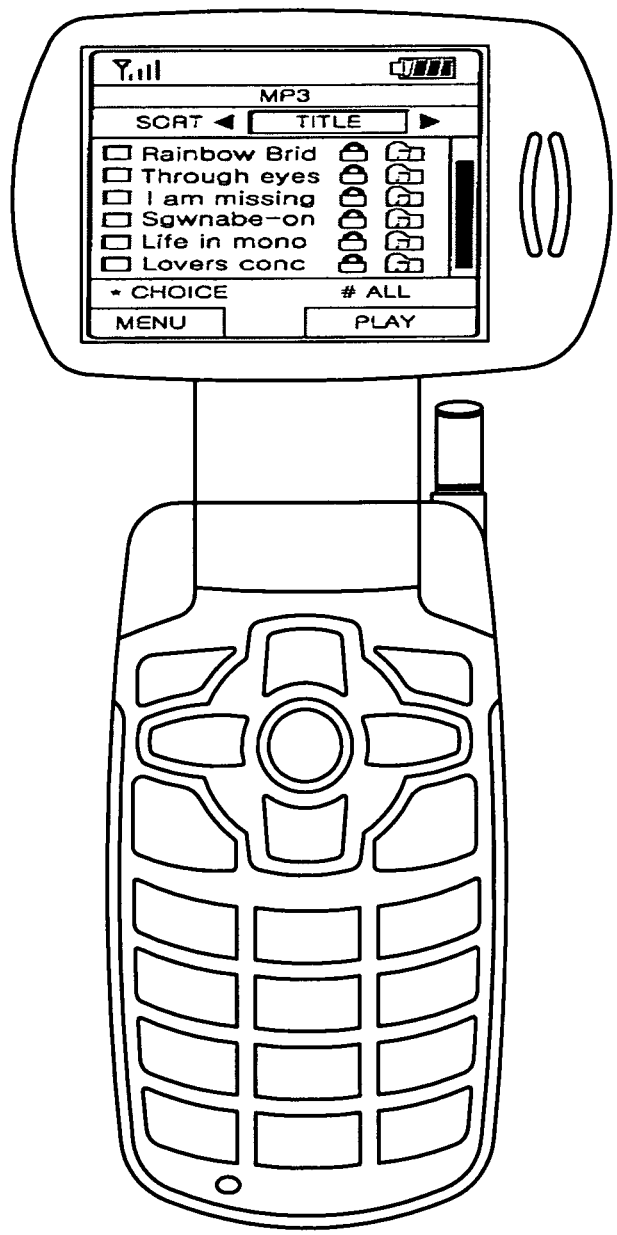
FIG. 1D is still another illustrative view showing a conventional horizontally-viewable telecommunication terminal wherein the display unit is rotated.

When the rotation of the display unit 204 occurs, the rotation sensing unit 214 senses the rotation state of the display unit 204 and determines if the display unit 204 is currently in the horizontal direction as shown in FIG. 1B or in the vertical direction as shown in FIG. 1A. As used herein, the state wherein the display unit 204 is in the horizontal direction refers to a condition wherein, after the display unit 204 is rotated, the horizontal length of the display region is greater than the vertical length thereof. It may also be said that the display unit 204 is rotated in the horizontal direction in that state. In addition, the state wherein the display unit 204 is in the vertical direction refers to a condition wherein, after the display unit 204 is rotated, the vertical length of the display region is greater than the horizontal length thereof. It may also be said that the display unit 204 is rotated in the vertical direction in that state.

Figure 6A:
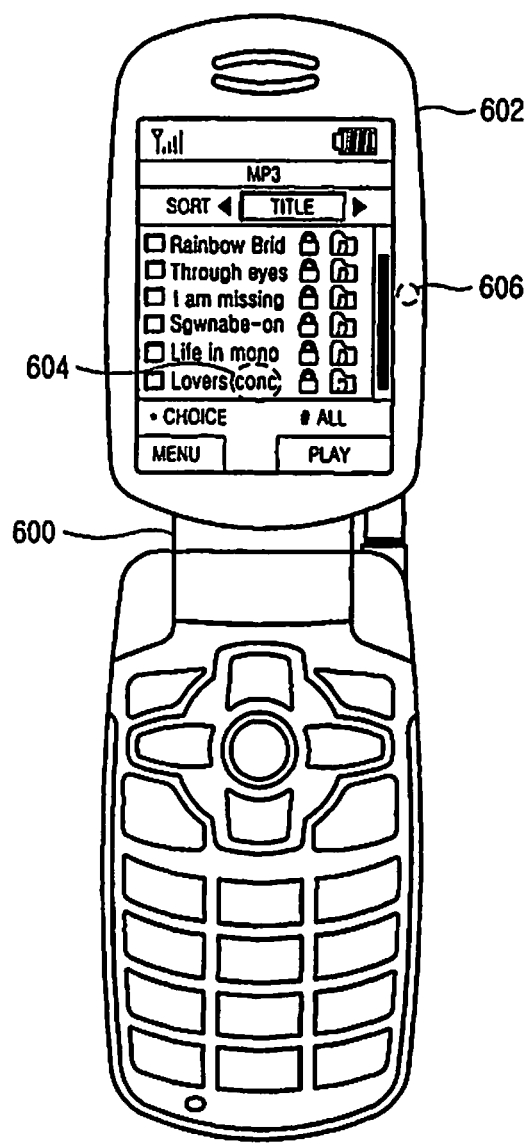
FIG. 6A is an illustrative view showing a UI which is modified according to the current rotation state of a display unit in a horizontally-viewable telecommunication terminal according to an embodiment of the present invention wherein the display unit is not rotated.
Figure 6B:
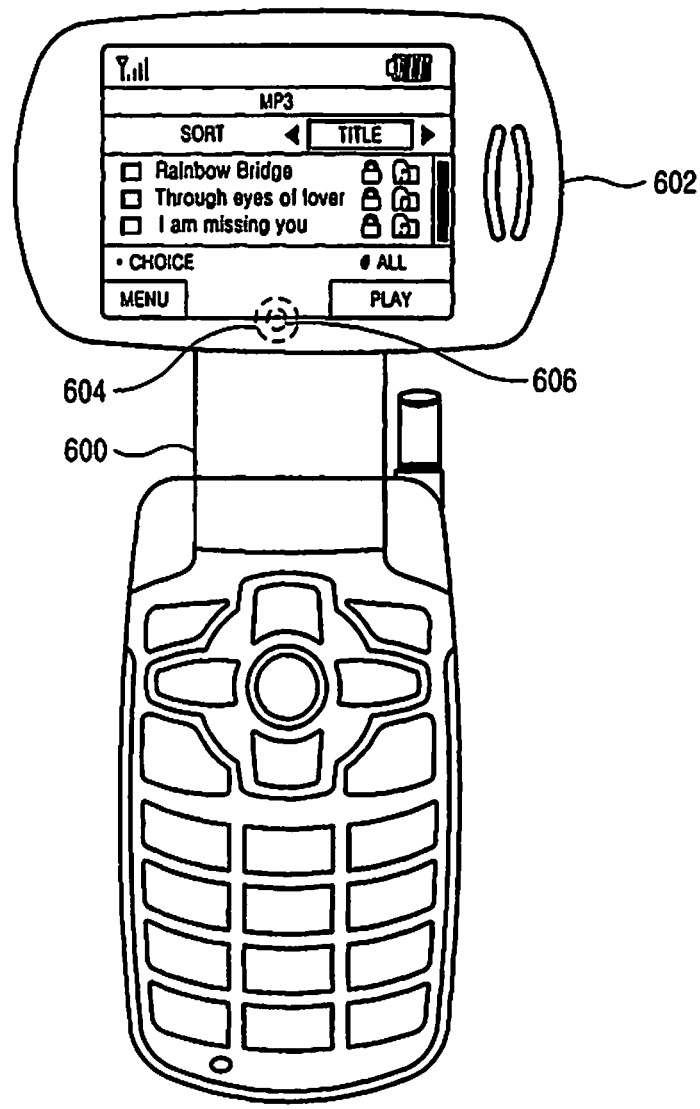
FIG. 6B is an illustrative view showing a UI which is modified according to the current rotation state of a display unit in a horizontally-viewable telecommunication terminal according to an embodiment of the present invention wherein the display unit is rotated.

The current state of the display unit 204, is input into the control unit 200. The rotation sensing unit 214 can sense the rotation state of the display unit 204 with a hall switch or may have an electromagnet and a magnetic field sensing unit to sense the rotation state of the display unit 204 by sensing the change of the magnetic field. Alternatively, the rotation sensing unit 204 can sense the rotation state of the display unit 204 from the difference between the contact point when the display unit 204 is in the vertical direction and that when in the horizontal direction. Referring to FIGS. 6A and 6B, according to an embodiment of the present invention, a rotation sensing unit 604 containing a magnetic field sensing unit can be placed in a display unit support body 600 and an electromagnet 606 can be placed inside a rotatable display unit 602, or vice versa.

The key input unit 203 has various keys, including numeric keys, as mentioned above, and provides the control unit 200 with key input from the user. The RF unit 208 transmits/receives RF signals to/from base stations. The RF unit 208 converts received signals into IF (intermediate frequency) signals and outputs them to the baseband processing unit 206 connected to the control unit 200. The RF unit 208 also converts IF signals input from the baseband processing unit 206 into RF signals and transmits them. The baseband processing unit 206 is a BBA (baseband analog ASIC) for providing an interface between the control unit 200 and the RF unit 208. The baseband processing unit 206 converts digital signals of baseband applied from the control unit 200 into analog IF signals and applies them to the RF unit 208. The baseband processing unit 206 also converts analog IF signals applied from the RF unit 208 into digital signals of baseband and applies them to the control unit 200. The codec 210, which connects to the control unit 200, is connected to a microphone and a speaker via an amplification unit 212. The codec 210 subjects voice signals input from the microphone to PCM (pulse code modulation) encoding and outputs voice data to the control unit 200. The codec 210 also subjects voice data input from the control unit 200 to PCM decoding and outputs it to the speaker via the amplification unit 212. The amplification unit 212 amplifies voice signals input from the microphone or output to the speaker and adjusts the volume of the speaker and the gain of the microphone under control of the control unit 200.

Figure 3:
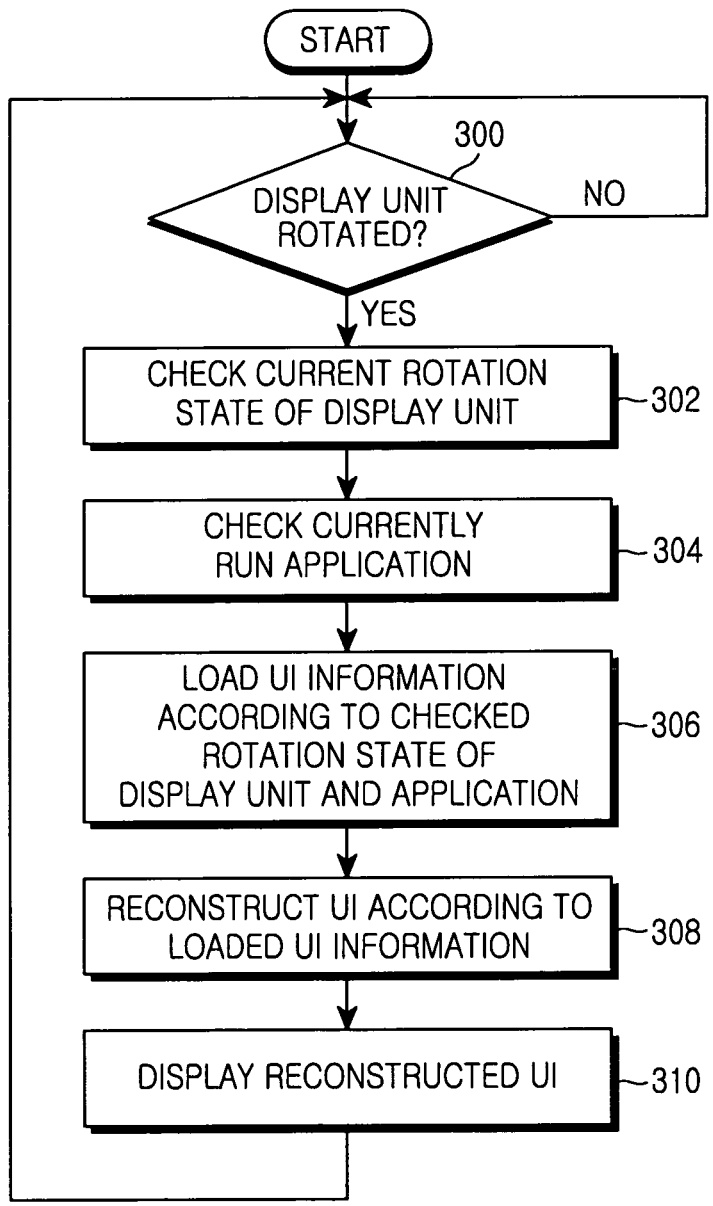
FIG. 3 is a flowchart showing the steps for displaying an UI according to the rotation state of a display unit in a horizontally-viewable telecommunication terminal according to an embodiment of the present invention.

FIG. 3 is a flowchart showing the steps for displaying an UI according to the rotation state of the display unit in a horizontally-viewable telecommunication terminal according to an embodiment of the present invention. Referring to FIG. 3, the control unit 200 of the horizontally-viewable telecommunication terminal according to an embodiment of the present invention proceeds to step 300 and determines if the rotation of the display unit 204 has occurred. If the rotation of the display unit 204 has occurred, the control unit 200 proceeds to step 302 and determines the current rotation state of the display unit 204. If it is confirmed that the display unit 204 has rotated in either the vertical direction as shown in FIG. 1A or the horizontal direction as shown in FIG. 1B, the control unit proceeds to step 304 and determines if there is a currently-run application, including an MP3 player or MPEG player.

After determines if there is a currently-running application in step 304, the control unit 304 proceeds to step 306 and chooses a UI from a number of U's included in the UI setup information stored in the UI setup information storage unit 218, according to the rotation state of the display unit 204 determined in step 302 and the application determined in step 304, and loads UI information from the UI information storage unit 216 according to the chosen UI. Step 306 will be described later in more detail with reference to FIG. 4. The control unit 200 proceeds to step 308 and reconstructs the UI screen according to the UI information loaded in step 306.

Although the UI may be determined according to only the rotation state of the display unit 204, it may also be determined according to both the rotation state and the currently-running application when a dedicated UI exists which has been preset according to the currently-running application. Table 1 shows examples of the UI setup information stored in the UI setup information storage unit 218. In Table 1, a preset UI is given according to each application and rotation state of the display unit 204.

TABLE 1

| Application | Dedicated UI exists? | Rotation state of display unit | Dedicated UI | ... |
|---|---|---|---|---|
| MP3 player | Yes | Horizontal direction | MP3_Type_A | ... |
|  |  | Vertical direction | MP3_Type_B | ... |
| MPEG player | Yes | Horizontal direction | MPEG_Type_A | ... |
|  |  | Vertical direction | MPEG_Type_A | ... |
| ... | ... | ... | ... | ... |

Figure 5A:
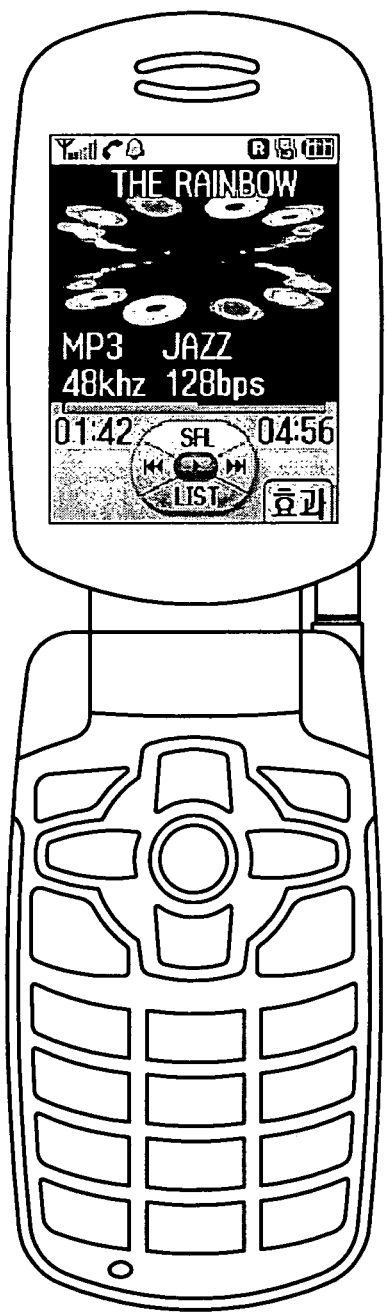
FIG. 5A is an illustrative view showing a UI according to the current rotation state of a display unit and a currently-run application in a horizontally-viewable telecommunication terminal according to an embodiment of the present invention wherein the display unit is not rotated.
Figure 5B:
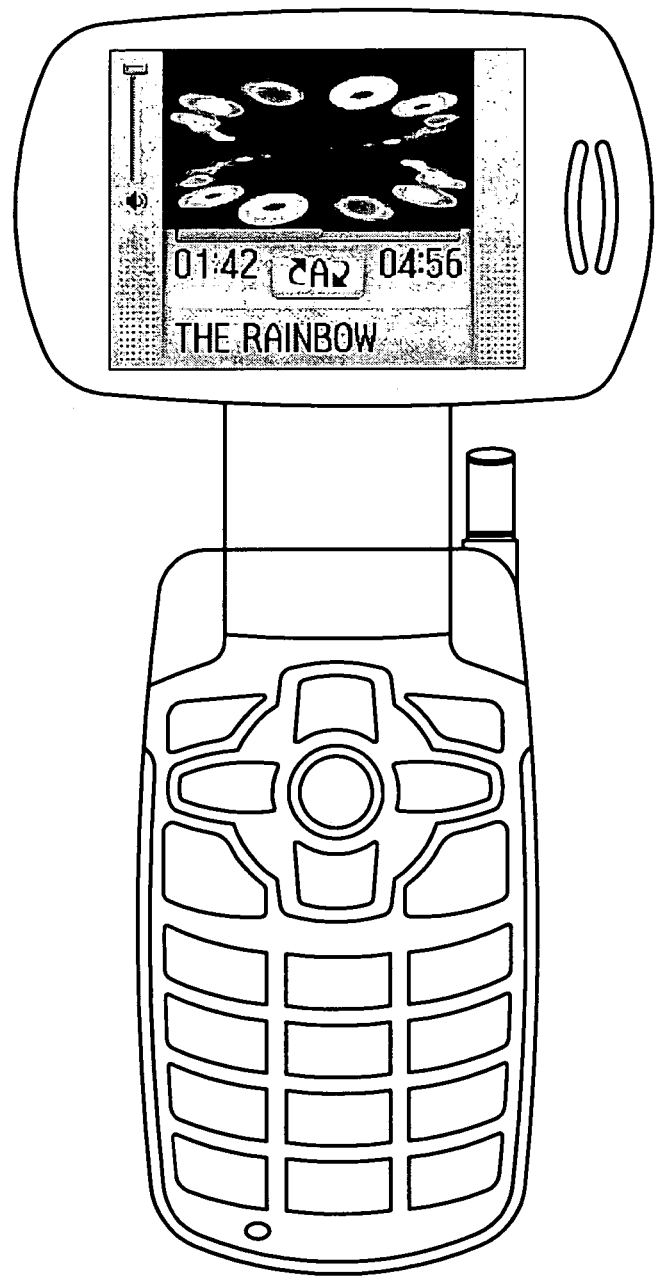
FIG. 5B is an illustrative view showing a UI according to the current rotation state of a display unit and a currently-run application in a horizontally-viewable telecommunication terminal according to an embodiment of the present invention wherein the display unit is rotated.

In the case of "MP3 player" application, referring to Table 1, different dedicated UI screens are given according to the rotation state of the display unit 204. More specifically, "MP3_Type_A" is given as the dedicated UI when the rotation state of the display unit corresponds to the horizontal direction and "MP3_Type_B" is given as the dedicated UI when the rotation state corresponds to the vertical direction. When a MP3 player is run in a horizontally-viewable telecommunication terminal according to an embodiment of the present invention, different UIs are chosen as the user rotates the display unit 204 from the vertical direction to the horizontal direction or vice versa, and different UI information is loaded by the control unit 200 accordingly. The UI screen is then reconstructed according to the loaded UI information. Such an example is illustrated in FIGS. 5A and 5B.

It is not necessary that all of the applications have respective dedicated U's according to the rotation state of the display unit 204. In such a case, the control unit 200 uses a common UI information which has been preset according to the rotation state of the display unit 204 and reconstructs the UI screen. An example of such common UI information includes horizontal UI information used when the rotation state of the display unit 204 corresponds to the horizontal direction, and vertical UI information used when the rotation state corresponds to the vertical direction.

The difference between the horizontal UI information and the vertical UI information may be attributed to the horizontal or vertical size of the UI screen according to the rotation state of the display unit 204. When an application having no dedicated UI according to the rotation state of the display unit 204 is run and the rotation of the display unit 204 occurs, the control unit 200 loads information on the horizontal and vertical screen sizes suitable for the rotation state of the display unit 204. The UI screen is then reconstructed according to the loaded information. Suppose that the display unit 204 is in the vertical direction and has less than eight characters displayed in a line, if the display unit 204 is rotated in the horizontal direction, the UI is reconstructed in such a manner that it can display at least eight characters as the horizontal size for display increases. An example of a UI screen reconstructed according to the rotation of the display unit 204, in the case of an application having a common UI screen according to the rotation of the display unit 204, will be described later with reference to FIGS. 6A and 6B.

After reconstructing the UI screen by loading UI information in step 308, the control unit 200 proceeds to step 310 wherein it rotates the reconstructed UI screen according to the rotation state of the display unit 204 and displays it. When the display unit 204 is rotated from the vertical direction to the horizontal direction, for example, the control unit 200 rotates the UI screen, which has been reconstructed according to the rotation state of the display unit 204 rotated in the horizontal direction, according to the rotation state and displays it. If the display unit 204 is rotated +90°, the UI screen is rotated −90° and displayed. When the display unit 204 is rotated, the reconstructed UI screen is rotated in such a direction that the influence of the rotation is compensated for. As a result, the user is always provided with a UI screen displayed from top to bottom for improved user convenience.

When the display unit 204 is rotated from the horizontal direction to the vertical direction, the control unit 200 re-rotates the UI screen, which has been reconstructed according to the rotation state of the display unit 204 rotated in the vertical direction, and displays it. If the display unit 204, which has been rotated from the vertical direction to the horizontal direction, is again rotated from the horizontal direction to the vertical direction, the display unit 204 returns to the original position. The control unit 200 then display the reconstructed UI without rotating it. Even when the display unit 204 is rotated from the horizontal direction to the vertical direction and returns to the original position, the UI screen is always displayed from top to bottom for improved user convenience.

Figure 4:
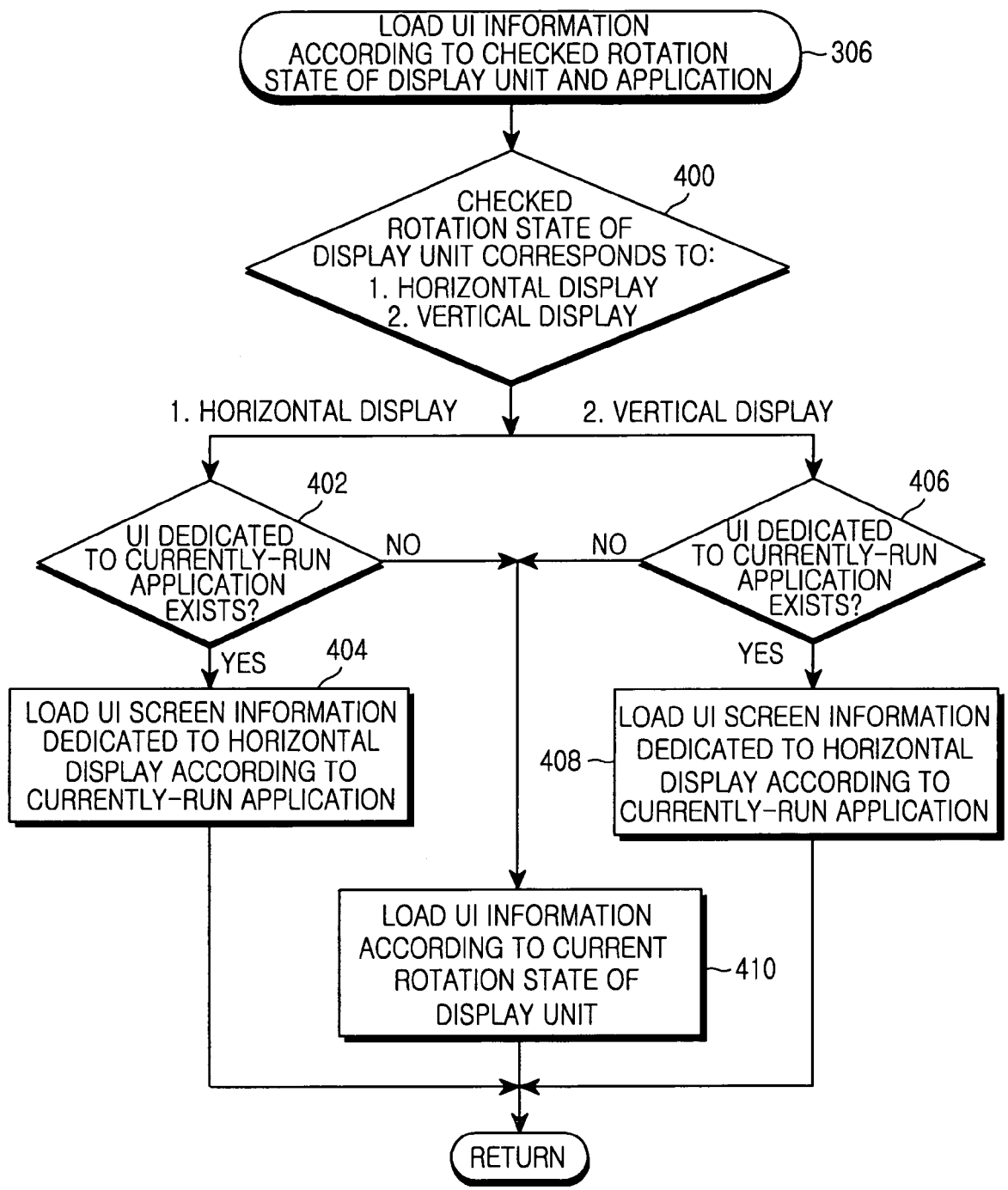
FIG. 4 is a flowchart showing the steps for displaying an UI according to the current rotation state of a display unit and a currently-run application in a horizontally-viewable telecommunication terminal according to an embodiment of the present invention.

FIG. 4 shows in detail step 306 of loading UI information from the UI information storage unit 216 according to the rotation state of the display unit determined in FIG. 3 and the currently-running application. After determining the current rotation state of the display unit 204 and the currently-running application in steps 302 and 304, referring to FIG. 4, the control unit 200 proceeds to step 400 and decides if the determined rotation state of the display unit corresponds to either a horizontal display state or a vertical display state. If it is confirmed that the current rotation state of the display unit 204 corresponds to the horizontal display state (i.e. it is rotated in the horizontal direction), the control unit 200 proceeds to step 402 and searches for a dedicated UI which is dedicated to the currently-running application from the UI setup information stored in the UI setup information storage unit 218. When a UI dedicated to the horizontal display according to the currently-running application is found, the control unit proceeds to step 404 and loads UI information according to the UI dedicated to the horizontal display. The control unit 200 then proceeds to step 308 in FIG. 3 and reconstructs the UI screen according to the loaded UI information.

If it is confirmed that the current rotation state of the display unit 204 corresponds to the vertical display state (i.e. it is rotated in the vertical direction) in step 400, the control unit 200 proceeds to step 406 and searches for a dedicated UI which is dedicated to the currently-running application from the UI setup information stored in the UI setup information storage unit 218. When a UI dedicated to the vertical display according to the currently-running application is found, the control unit proceeds to step 408 and loads UI information according to the UI dedicated to the vertical display. The control unit 200 then proceeds to step 308 in FIG. 3 and reconstructs the UI screen according to the loaded UI information.

When no UI dedicated to the currently-run application is found in step 402 or 406, the control unit 200 proceeds to step 410 and loads UI information which has been preset according to the current rotation state of the display unit 204. The UI information preset according to the rotation state of the display unit 204 includes the horizontal UI information and the vertical UI information, which are commonly used in the case of an application having no dedicated UI. If UI information is loaded in any one of steps 406, 408, and 410, the control unit 200 proceeds to step 308 in FIG. 3 reconstructs the UI screen according to the currently-loaded UI information.

FIGS. 5A to 6B show examples of UI screens reconstructed according to the rotation state of the display unit 204 and the currently-run application, as mentioned above. FIGS. 5A and 5B show examples of dedicated UIs when different dedicated UIs have been set according to the rotation state of the display unit 204. FIG. 5A shows a case wherein "MP3_Type_B" UI is chosen from the UI setup information given in Table 1, which corresponds to a UI dedicated to an MP3 player when the display unit 204 has been rotated in the vertical direction, and a UI screen is displayed which has been constructed according to UI information corresponding to the "MP3_Type_B" UI. FIG. 5B shows a case wherein "MP3_Type_A" UI is chosen from the UI setup information given in Table 1, which corresponds to a UI dedicated to an MP3 player when the display unit 204 has been rotated in the horizontal direction, and a UI screen is displayed which has been constructed according to UI information corresponding to the "MP3_Type_A" UI.

When an application is run which has different dedicated UI screens according to the rotation state of the display unit 204, referring to FIGS. 5A and 5B for comparison, the horizontally-viewable telecommunication terminal according to the present invention senses the rotation state of the display unit 204 and reconstructs the UI accordingly. The UI is then rotated in such a direction that the rotation is compensated for and is displayed. Even when the same application is run, therefore, different U's are provided according to the state of the display unit 204.

FIGS. 6A and 6B show examples of U's reconstructed according to the rotation state of the display unit 204 and displayed, when no dedicated UI is used according to the rotation state of the display unit 204, in a horizontally-viewable telecommunication terminal according to an embodiment of the present invention. FIG. 6A shows an example of a UI screen displayed when the display unit 204 is in the vertical direction. FIG. 6B shows an example of a UI screen displayed when the display unit 204 is rotated in the horizontal direction. If the user rotates the display unit 204 from the state shown in FIG. 6A into the state shown in FIG. 6B, the control unit 200 of the horizontally-viewable telecommunication terminal according to the present invention loads horizontal UI information corresponding to a case wherein the display unit has been rotated in the horizontal direction, among common UI information which applications having no dedicated UI can commonly use.

The horizontal UI information includes information on the horizontal and vertical sizes of the display region of the display unit 204 when in the horizontal direction. The vertical UI information includes information on the horizontal and vertical sizes of the display region of the display unit 204 when in the vertical direction. When the display unit 204 is rotated in the horizontal direction, as shown in FIG. 6B, the UI screen is reconstructed to have modified horizontal and vertical sizes of the display screen according to the horizontal UI information. The reconstructed UI screen is rotated in a such a direction that the current rotation of the display unit 204 is compensated for and is displayed. As such, the horizontally-viewable telecommunication terminal according to the present invention senses the rotation of the display unit and provides the user with a UI optimized for the current rotation state of the display unit.

In the horizontally-viewable telecommunication terminal according to the present invention, as mentioned above, the control unit determines the current rotation state of the display unit through the rotation sensing unit. When the rotation state of the display unit varies, UI information is loaded according to the currently-determined rotation state of the display unit. The UI screen is reconstructed according to the loaded UI information and is then rotated according to the rotation state of the display unit and displayed. If information on a dedicated UI screen which has been preset according to a currently-running application is found during the step of loading the UI information, then the information on the dedicated UI screen is loaded. The UI screen is reconstructed according to the loaded information on the dedicated UI screen and is displayed. Even when the display unit is rotated, therefore, the user can be provided with a UI screen which is displayed after being suitably reconstructed and rotated according to the rotation state of the display unit for improved user convenience.

Although the present invention has been described with reference to certain embodiments thereof, various modifications can be made without departing from the scope of the present invention. Although examples of telecommunication terminals have been illustrated wherein the display unit can rotate only in the horizontal and vertical directions, in particular, the present invention can also be applied to examples wherein the display is adapted to rotate in other directions and can provide the user with a UI optimized and reconstructed according to the rotation of the display unit. Although the UI is shown to be modified according to the rotation state of the display unit, this relates to the user interface only and does not affect the currently-running application. When an application is run to play MP3, for example, the UI modified according to the rotation of the display unit does not affect the operation of the application.

Although examples of reconstructing the UI screen according to UI information (horizontal and vertical UI information) commonly usable by applications having no dedicated UI screen have been given, every application may have dedicated UI screens of their own. The UI information on the dedicated UI screens may include information on dedicated icons included only in the corresponding dedicated UI screens.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for displaying a user interface (UI) for a telecommunication terminal having a rotatable display unit, the apparatus comprising:

a rotation sensing unit for sensing the rotation of the display unit and has an electromagnet positioned on one of the display unit and the body of the telecommunication terminal; and a magnetic field sensing unit capable of sensing the magnetic field of the electromagnet positioned on the other of the display unit and the body of the telecommunication terminal to sense the rotation state of the display unit through the amount of change of the magnetic field which varies according to the rotation state of the display unit;

a memory unit for storing UI information on at least one UI screen according to rotation states of the display unit; and a control unit for determining a currently running application in the telecommunication terminal, selecting UI information according to at least one of the rotation states of the display unit and the currently running application, constructing a UI screen according to the selected UI information, rotating the constructed UI screen in a direction according to the rotation state of the display unit, and displaying the UI screen.

2. The apparatus for displaying a user interface for a telecommunication terminal as claimed in claim 1, wherein the rotation sensing unit has a hall switch to sense the rotation state of the display unit.

3. The apparatus for displaying a user interface for a telecommunication terminal as claimed in claim 1, wherein the rotation sensing unit is adapted to sense the rotation state of the display unit through the contact between the body of the telecommunication terminal and a contact point of the display unit, which varies according to the rotation state of the display unit.

4. The apparatus for displaying a user interface for a telecommunication terminal as claimed in claim 1, wherein the memory unit further stores UI setup information including UI information which has been preset according to at least one of the rotation state of the display unit and the currently-running application.

5. The apparatus for displaying a user interface for a telecommunication terminal as claimed in claim 4, wherein the control unit is adapted to choose UI information from the UI information included in the UI setup information according to at least one of the rotation state of the display unit and the currently-run application.

6. The apparatus for displaying a user interface for a telecommunication terminal as claimed in claim 1, wherein the control unit is adapted to display the constructed UI after rotating the display unit in such a manner that the rotation angle and direction of the display unit are compensated for.

7. The apparatus for displaying a user interface for a telecommunication terminal as claimed in claim 1, wherein the display unit is adapted to be rotated to one of a horizontal state in which the horizontal length of the display region is greater than the vertical length thereof and a vertical state in which the vertical length of the display region is greater than the horizontal length thereof.

* * * * *